United States Patent
Torii et al.

(10) Patent No.: US 10,068,483 B2
(45) Date of Patent: Sep. 4, 2018

(54) PARKING ASSISTANCE DEVICE

(71) Applicants: AISIN SEIKI KABUSHIKI KAISHA, Kariya-shi (JP); HONDA MOTOR CO., LTD., Minato-ku (JP)

(72) Inventors: Masanori Torii, Kariya (JP); Jun Kadowaki, Kariya (JP); Hiroki Inagaki, Kariya (JP); Katsuhiro Sakai, Wako (JP)

(73) Assignees: AISIN SEIKI KABUSHIKI KAISHA, Kariya-Shi, Aichi (JP); HONDA MOTOR CO., LTD., Minato-Ku, Tokyo (JP)

( * ) Notice: Subject to any disclaimer, the term of this patent is extended or adjusted under 35 U.S.C. 154(b) by 338 days.

(21) Appl. No.: 14/502,304

(22) Filed: Sep. 30, 2014

(65) Prior Publication Data
US 2015/0097956 A1    Apr. 9, 2015

(30) Foreign Application Priority Data
Oct. 4, 2013    (JP) .................................. 2013-209671

(51) Int. Cl.
*G08G 1/16*    (2006.01)
*G06K 9/00*    (2006.01)

(52) U.S. Cl.
CPC ......... *G08G 1/168* (2013.01); *G06K 9/00812* (2013.01)

(58) Field of Classification Search
CPC .............................................. B60R 2300/806
(Continued)

(56) References Cited

U.S. PATENT DOCUMENTS

| | | | |
|---|---|---|---|
| 2007/0146165 A1* | 6/2007 | Tanaka | B62D 15/0285 340/932.2 |
| 2011/0298639 A1* | 12/2011 | Kadowaki | B62D 15/027 340/932.2 |
| 2015/0258988 A1* | 9/2015 | Morimoto | B62D 15/027 701/70 |

FOREIGN PATENT DOCUMENTS

| | | |
|---|---|---|
| JP | 2009-206615 A | 9/2009 |
| JP | 2009-298384 A | 12/2009 |

(Continued)

OTHER PUBLICATIONS

Office Action (Notice of Reasons for Rejection) dated Apr. 5, 2016, by the Japanese Patent Office in corresponding Japanese Patent Application No. 2013-209671 and partial translation of Office Action. (3 pages).

(Continued)

*Primary Examiner* — Ayman Abaza
(74) *Attorney, Agent, or Firm* — Buchanan Ingersoll & Rooney PC

(57) ABSTRACT

A parking assistance device includes: a ground object detection unit configured to, in a predetermined detection region set in advance in at least a portion of the vehicle periphery, perform detection of a ground object defining a parking stall in which garage parking is to be performed; an end portion specification unit configured to specify an end portion of the ground object detected by the ground object detection unit, the end portion being located on an entrance side of the parking stall; and a target parking stall setting unit configured to set, based on the end portion on the entrance side specified by the end portion specification unit, a corner portion of a rectangular parking frame that defines a target parking stall in which the vehicle is to be parked, and set the parking frame to extend from the corner portion in the depth direction of the parking stall.

5 Claims, 6 Drawing Sheets

(58) Field of Classification Search
USPC .......................................................... 348/148
See application file for complete search history.

(56) References Cited

FOREIGN PATENT DOCUMENTS

| JP | 2009298384 A | * | 12/2009 |
| JP | 2012-001081 A | | 1/2012 |
| JP | 2013-154730 A | | 8/2013 |
| JP | 2013154730 A | * | 8/2013 |

OTHER PUBLICATIONS

Office Action (Notice of Reasons for Rejection) dated Sep. 1, 2015, by the Japanese Patent Office in corresponding Japanese Patent Application No. 2013-209671, with an English Language Translation of the Office Action (6 pages).

* cited by examiner (a)

(b)

(c)

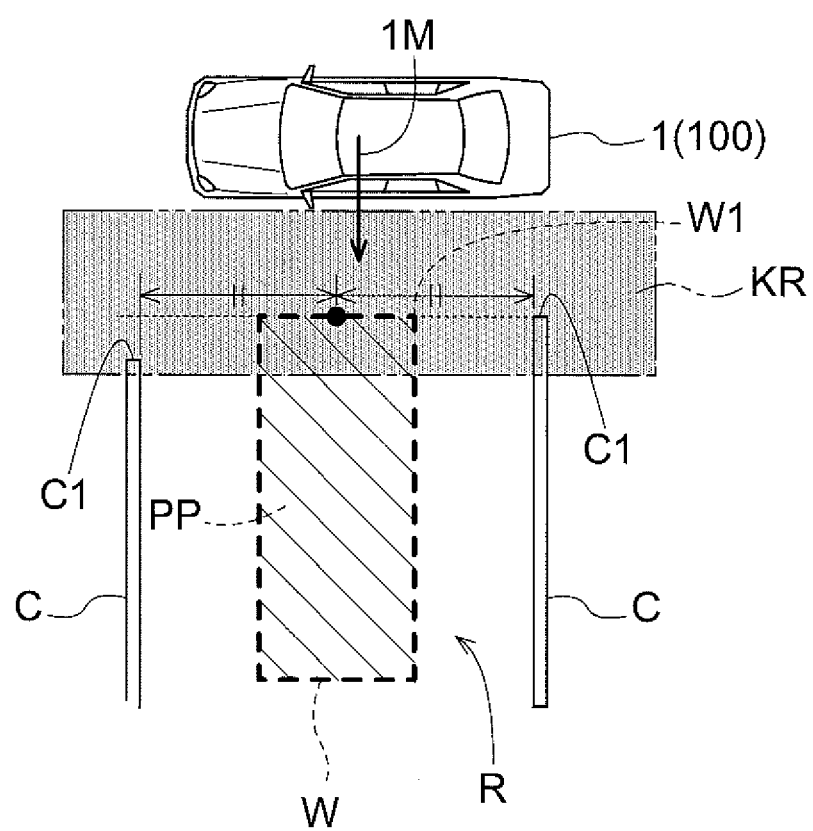

PARKING ASSISTANCE DEVICE

CROSS REFERENCE TO RELATED APPLICATIONS

This application is based on and claims priority under 35 U.S.C. Section 119 to Japanese Patent Application No. 2013-209671 filed on Oct. 4, 2013, the entire content of which is incorporated herein by reference.

TECHNICAL FIELD

This disclosure relates to a parking assistance device configured to automatically set a parking frame that defines a target parking position in which a vehicle is to be parked.

BACKGROUND DISCUSSION

Conventionally, parking assistance devices that assist a parking operation of a driver performing garage parking of a vehicle have been used. JP 2009-206615A discloses an example of this type of technique.

The parking assistance device disclosed in JP2009-206615A is configured to, while a vehicle travels along a direction in which a road extends, detect an entrance portion of a parking space into which the vehicle is about to be parked, and calculate a guide route for the vehicle based on the detection result. If white lines have been drawn on only the left and right sides of the parking space, the parking assistance device detects the front end portions of the pair of white lines and sets the entrance portion to be on a straight line connecting the two front end portions of the white lines. Also, if the parking space is completely surrounded by white lines, the parking assistance device sets the entrance portion of the parking space to be on the white line drawn in the vehicle width direction that is on the frontmost side of the parking space. Furthermore, if other vehicles have already been parked on the left and right sides of the parking space in which the vehicle is about to be parked, the parking assistance device recognizes the front corner portions of the vehicles and sets the entrance portion to be on a line connecting the two front corner portions.

SUMMARY

With the technique disclosed in JP 2009-206615A, in the case where other vehicles are already parked on the left and right sides of the parking space in which the vehicle is about to be parked as described above, the respective front corner portions of the other vehicles on the left and right sides are recognized, and the entrance portion is set to be on the line connecting the two front corner portions. In such a case, the position of the line connecting the two front corner portions of the other vehicles on the left and right sides is used as a reference to set the parking target position. If the vehicle is caused to travel in reverse while turning in order to park the vehicle in such a parking target position, the travel route of the vehicle will be close to an adjacent vehicle having a front corner portion located on a side of the vehicle, and thus there is a possibility that the vehicle will come into contact with the adjacent vehicle.

In view of the above-mentioned problem, this disclosure provides a parking assistance device configured to prevent collision between the vehicle and an object, even in the case where the positions of ground objects defining a target parking position are shifted in the depth direction of a parking stall.

A characteristic configuration of a parking assistance device includes: a ground object detection unit configured to, in a predetermined detection region set in advance in at least a portion of the periphery of a vehicle, perform detection of ground objects defining a parking stall in which garage parking is to be performed; an end portion specification unit configured to specify an end portion of the ground objects detected by the ground object detection unit, the end portion being located on an entrance side of the parking stall; and a target parking stall setting unit configured to, based on the end on the entrance side specified by the end portion specification unit, set a corner portion of a rectangular parking frame that defines a target parking stall in which the vehicle is to be parked, and set the parking frame such that it extends from the corner portion in the depth direction of the parking stall.

BRIEF DESCRIPTION OF THE DRAWINGS

FIG. 9 is a diagram showing detection of a ground object and specification of an end portion according to another embodiment.

DETAILED DESCRIPTION

Figure 1:
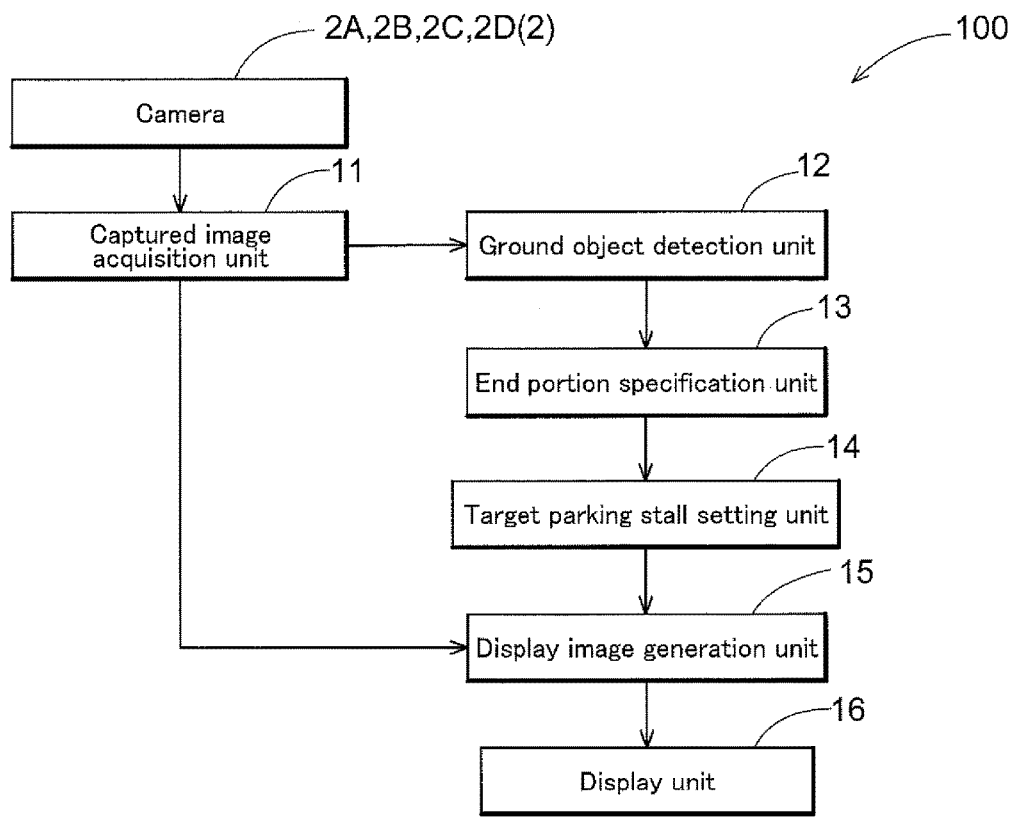
FIG. 1 is a schematic block diagram showing a configuration of a parking assistance device.

A parking assistance device according to this disclosure relates to a parking assistance device configured to automatically set a parking frame defining a target parking stall in which garage parking is to be performed. A parking assistance device 100 according to the present embodiment will be described in detail hereinafter.

A characteristic configuration of a parking assistance device according to this disclosure includes: a ground object detection unit configured to, in a predetermined detection region set in advance in at least a portion of the periphery of a vehicle, perform detection of ground objects defining a parking stall in which garage parking is to be performed; an end portion specification unit configured to specify an end portion of the ground objects detected by the ground object detection unit, the end portion being located on an entrance side of the parking stall; and a target parking stall setting unit configured to, based on the end portion on the entrance side specified by the end portion specification unit, set a corner portion of a rectangular parking frame that defines a target parking stall in which the vehicle is to be parked, and set the parking frame such that it extends from the corner portion in the depth direction of the parking stall.

With this kind of characteristic configuration, even if ground objects defining a parking stall in which a vehicle is to be parked are worn away, it is possible to, among the end portions of the detected ground objects, set a parking frame with reference given to the end portion on the entrance side of the parking stall. Accordingly, even if another vehicle has been parked in a parking stall adjacent to the target parking stall, the vehicle can be caused to travel according to the parking frame set with reference to the above-described end portion on the entrance side of the parking stall, and therefore the vehicle does not come into contact with the other vehicle.

Also, it is preferable that the target parking stall setting unit re-sets the parking frame according to movement of the detection region accompanying movement of the vehicle.

With this kind of configuration, if the driver does not like the target parking stall that was first set, by merely moving the vehicle, another target parking stall can be set automatically. Accordingly, no burden is placed on the driver of the vehicle to re-set the target parking stall, and therefore the driver can focus on driving.

Also, it is preferable that the target parking stall setting unit sets the parking frame such that the end portion on the entrance side and the corner portion are aligned in the short side direction of the parking frame.

With this kind of configuration, the parking frame can be set with reference to the end portion on the entrance side of the parking stall regardless of the length in the width direction of the parking stall. Accordingly, by setting the parking frame in the central portion of the parking stall for example, it is possible to park the vehicle in the central portion of the parking stall.

FIG. 1 is a schematic block diagram showing a configuration of a parking assistance device 100 according to the present embodiment. As shown in FIG. 1, the parking assistance device 100 is configured to include functional units, namely a captured image acquisition unit 11, a ground object detection unit 12, an end portion specification unit 13, a target parking stall setting unit 14, a display image generation unit 15, and a display unit 16. The functional units use a CPU as a core member, and the above-mentioned functional units for performing various types of processing for automatically setting a parking frame W that defines a target parking stall PP in which a vehicle 1 is to be parked are configured by hardware, software, or both. In the present embodiment, the parking assistance device 100 is included in a vehicle 1.

Figure 2:
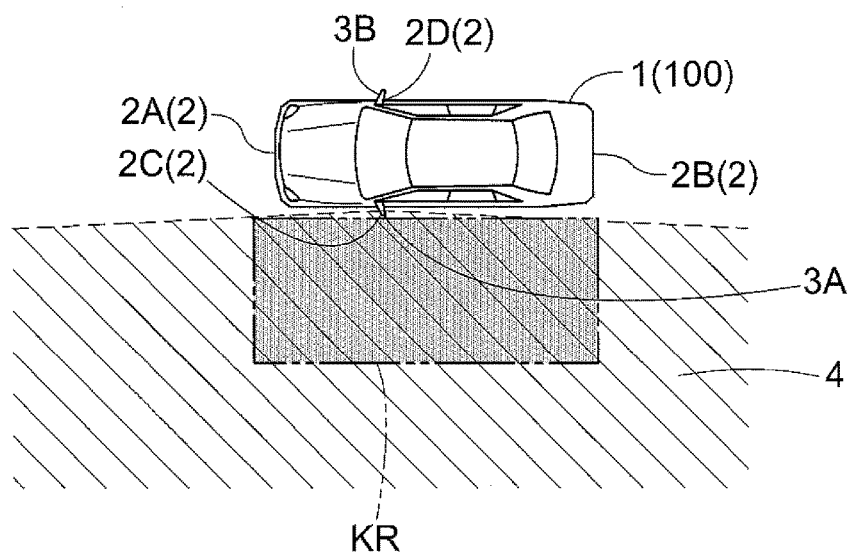
FIG. 2 is a diagram showing an example of an imaging range and a detection range.

The captured image acquisition unit 11 acquires a captured image of a view of the periphery of the vehicle 1. The periphery of the vehicle 1 is the front, back, left side, and right side of the vehicle 1. A captured image is acquired by cameras 2A to 2D included in the vehicle 1. For this reason, as shown in FIG. 2, the front camera 2A that acquires a captured image of the front of the vehicle 1 is provided in the central portion in the width direction of the front end portion of the vehicle 1, for example, and the camera 2B that acquires a captured image of the back of the vehicle 1 is provided in the central portion in the width direction of the back end portion of the vehicle 1, for example. Also, the camera 2C that acquires a captured image of the left side of the vehicle 1 and the camera 2D that acquires a captured image of the right side of the vehicle 1 are arranged respectively on left and right door mirrors 3A and 3B of the vehicle 1, for example. Note that if it is not necessary to make any particular distinction between the respective cameras 2A to 2D below, they will be described as "camera 2". The captured image acquisition unit 11 acquires a captured image of a view of the periphery of the vehicle 1, captured by this kind of camera 2. The captured image acquired by the captured image acquisition unit 11 is transferred to the ground object detection unit 12 and the display image generation unit 15, which will be described later.

Figure 3:
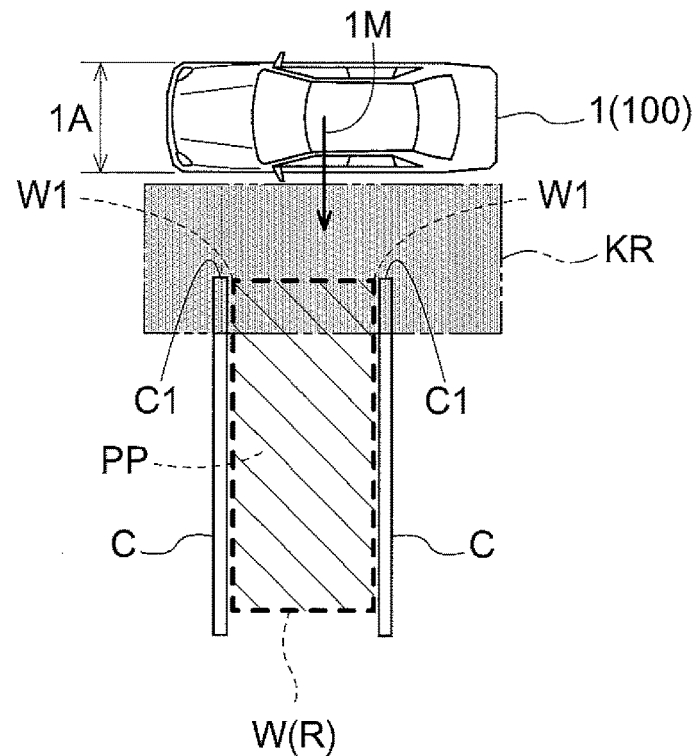
FIG. 3 is a diagram showing detection of a ground object and specification of an end portion.

The ground object detection unit 12 performs detection of ground objects C that define a parking stall R for performing garage parking in a predetermined detection region KR set in advance in at least a portion of the periphery of the vehicle 1. In the present embodiment, at least a portion of the periphery of the vehicle 1 is the left side and right side of the vehicle 1, which are the lateral sides of the vehicle 1. In the present embodiment, in order to simplify the description, a description will be given in which the lateral side of the vehicle 1 is the left side when facing the proceeding direction of the vehicle 1. The detection region KR is included in the imaging range 4 of the camera 2C as shown in FIG. 2. In the present embodiment, the detection region KR is set along the vehicle length direction of the vehicle 1 on the left side of the vehicle 1. The parking stall R for performing garage parking is a stall having space in which the vehicle 1 can perform garage parking. The ground object C corresponds to a white line, a curbstone, a hedge, or the like that defines this kind of parking stall R. For this reason, the ground objects C that define the parking stall R correspond to a pair of ground objects C having a gap therebetween that is at least wider than the width 1A of the vehicle 1 as shown in FIG. 3. The ground object detection unit 12 detects this kind of ground object C that defines the parking stall R by performing image recognition with respect to the captured image transferred from the captured image acquisition unit 11. Since the detection region KR also moves according to the traveling of the vehicle 1, detection of the ground objects C is performed sequentially according to the traveling of the vehicle 1. The result of detection performed by the ground object detection unit 12 is transferred to the end portion specification unit 13, which will be described later.

The end portion specification unit 13 specifies an end portion C1 of the ground objects C detected by the ground object detection unit 12, the end portion C1 being located on the entrance side of a parking stall R. In the present embodiment, the ground objects C detected by the ground object detection unit 12 are a pair of ground objects C that have been detected in the detection region KR set on the lateral side of the vehicle 1, and that have a gap therebetween that is at least wider than the width 1A of the vehicle 1. The entrance side of the parking stall R is the entrance to the parking stall R when the vehicle 1 is to be parked in the parking stall R. In the present embodiment, it corresponds to the near side in the vehicle width direction 1M, which is the direction in which the left and right door mirrors of the vehicle 1 are connected by a virtual line. The near side in the vehicle width direction 1M is the side near the vehicle 1 in a view in the vehicle width direction 1M from the lateral side of the vehicle 1. The end portions C1 of the ground objects C refer to edge portions that define the ground objects C obtained using image recognition. Accordingly, the end portion C1 on the entrance side of the parking stall R corresponds to, among the detected ground objects C, the edge portion closest to the vehicle 1 in a view from the vehicle 1 in the vehicle width direction 1M. The result of the detection performed by the end portion specification unit 13 is transferred to the target parking stall setting unit 14, which will be described later.

Based on the end portion C1 on the entrance side that was specified by the end portion specification unit 13, the target parking stall setting unit 14 sets a corner portion W1 of a rectangular parking frame W that defines the target parking stall PP in which the vehicle 1 is to be parked and sets the parking frame W such that it extends from the corner portion W1 in the depth direction of the parking stall R. The end portion C1 on the entrance side that was specified by the end portion specification unit 13 is transferred from the end portion specification unit 13 as the detection result. The target parking stall PP in which the vehicle 1 is to be parked is one of the parking stalls R defined by the ground objects C, and is a parking stall R in which the vehicle 1 is to be parked. When this kind of target parking stall PP is set, it is indicated with the addition of a parking frame W on the display unit 16 serving as a monitor included in the vehicle 1 so that the fact that the target parking stall PP has been set and the position thereof are easy for the driver to recognize.

In order to indicate to the driver that there is enough space to park the vehicle 1, the parking frame W is shown according to the shape of the vehicle 1 in the image displayed on the display unit 16. Accordingly, the parking frame W is shown using a rectangular shape that is the shape of the vehicle 1. The corner portion W1 is one of the four vertices of the parking frame W displayed in such a rectangular shape.

Extending from the corner portion W1 in the depth direction of the parking stall R refers to the direction of moving away from the entrance of the parking stall R, and in the present embodiment, it refers to moving away from the corner portion W1 in the vehicle width direction 1M of the vehicle 1. Accordingly, among the four corner portions of the parking frame W, the target parking stall setting unit 14 sets the corner portion W1 as the corner portion at the position nearest to the vehicle 1, and, with reference to that position, sets the parking frame W such that it extends away from the vehicle 1 in the vehicle width direction 1M of the vehicle 1.

Figure 4:
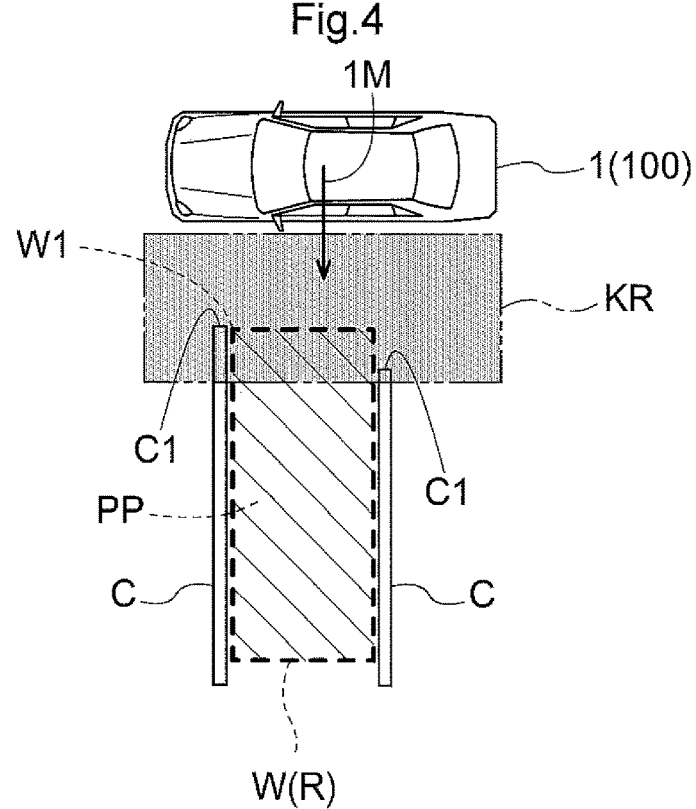
FIG. 4 is a diagram showing detection of a ground object and specification of an end portion.

In the present embodiment, the target parking stall setting unit 14 sets the parking frame W such that the end portion on the entrance side and the corner portion W1 match in the short side direction of the parking frame W. For example, as shown in FIG. 3, if the respective end portions C1 of a pair of ground objects C are at the same distance from the vehicle 1 in the vehicle width direction 1M of the vehicle 1, the parking frame W is set based on the pair of end portions C1. Note that in such a case, the parking frame W may be set using the central point in the direction perpendicular to the vehicle width direction 1M of the pair of end portions C1 (vehicle length direction of the vehicle 1) as a reference. Also, as shown in FIG. 4 for example, if the respective end portions C1 of the pair of ground objects C are not at the same distance from the vehicle 1 in the vehicle width direction 1M of the vehicle 1, the parking frame W is set using, out of the pair of end portions C1, the end portion C1 that is closer to the vehicle 1 in the vehicle width direction 1M of the vehicle 1 (in FIG. 4, the end portion C1 on the front side in the proceeding direction of the vehicle 1) as a reference (the corner portion W1 is set based on the end portion C1). This kind of parking frame W set by the target parking stall setting unit 14 is transferred to the display image generation unit 15, which will be described later.

The display image generation unit 15 generates a display image that is to be displayed on the display unit 16 based on the captured image acquired by the captured image acquisition unit 11 and the parking frame W set by the target parking stall setting unit 14. The captured image acquired by the captured image acquisition unit 11 is used as-is as the display image by the display image generation unit 15. In the present embodiment, a view captured by the camera 2C on the side on which the target parking stall PP has been set is displayed on the display unit 16 so that the position of the target parking stall PP set by the parking assistance device 100 is displayed to the driver of the vehicle 1. Accordingly, the display image generation unit 15 generates, as a display image, the captured image of the view that was captured by the camera 2C and acquired by the captured image acquisition unit 11. Note that the captured image of the view captured by the camera 2C may be displayed as-is by the display image generation unit 15, and it may be displayed on the display unit 16 with predetermined sites trimmed so as to match the image size.

The display image generation unit 15 displays the parking frame W set by the target parking stall setting unit 14 such that it is superimposed on the captured image. The parking frame W is displayed such that it is superimposed at a position corresponding to the coordinates in the captured image based on coordinates obtained when the end portion C1 was specified by the end portion specification unit 13. This kind of display image generated by the display image generation unit 15 is transferred to the display unit 16, which will be described later.

The display unit 16 is a monitor provided in the vehicle 1 that displays the view from the vehicle 1 as well as the parking frame W defining the target parking stall PP of the above-described vehicle 1. By looking at the parking frame W displayed on the display unit 16, the driver can intuitively recognize the positional relationship between the target parking stall PP set by the parking assistance device 100 and the vehicle 1.

Here, in the present embodiment, the target parking stall setting unit 14 is configured to re-set the parking frame W according to movement of the detection region KR accompanying movement of the vehicle 1. The detection region KR is set in advance at a predetermined position on the lateral side of the vehicle 1 as described above. For this reason, movement of the detection region KR accompanying movement of the vehicle 1 means that if the vehicle 1 moves, the detection region KR also moves along with it. In the present embodiment, the parking frame W is set with reference given to the end portions C1 of the ground objects C detected in the detection region KR. Accordingly, if the detection region KR moves accompanying movement of the vehicle 1, the ground object C that had been detected in the detection region KR will move out of the detection region KR and will no longer be detected, and a ground object C that was outside of the detection region KR and was not detected will move into the detection region KR and will be detected, and the state in the detection region KR will change over time according to the movement of the vehicle 1. Accordingly, the target parking stall setting unit 14 is configured to sequentially update the parking frame W according to the current state of the detection region KR.

An example of a parking frame W that is re-set so as to match the traveling of the vehicle 1 will be described with reference to FIG. 5. First, as shown in (a) of FIG. 5, as long as the respective end portions C1 of the pair of ground objects C are at the same distance from the vehicle 1 in the vehicle width direction 1M in the detection region KR set on the lateral side of the vehicle 1, the parking frame W is set with reference given to one of the end portions C1.

Figure 5:
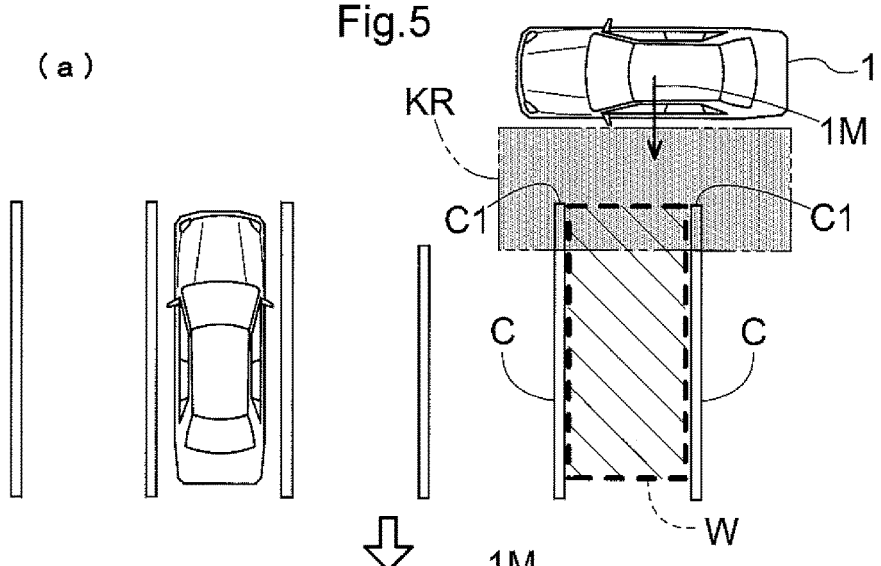
FIGS. 5 is a diagram showing a target parking stall set by a parking assistance device.
Figure 5:
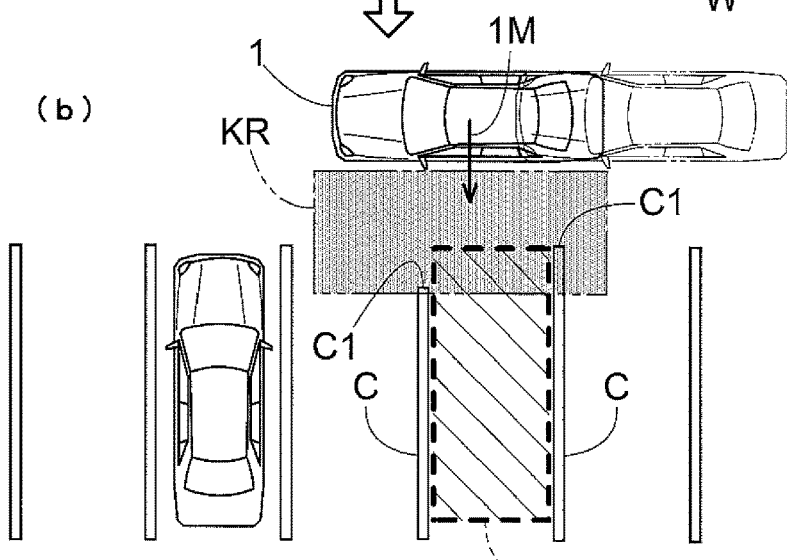
Figure 5:
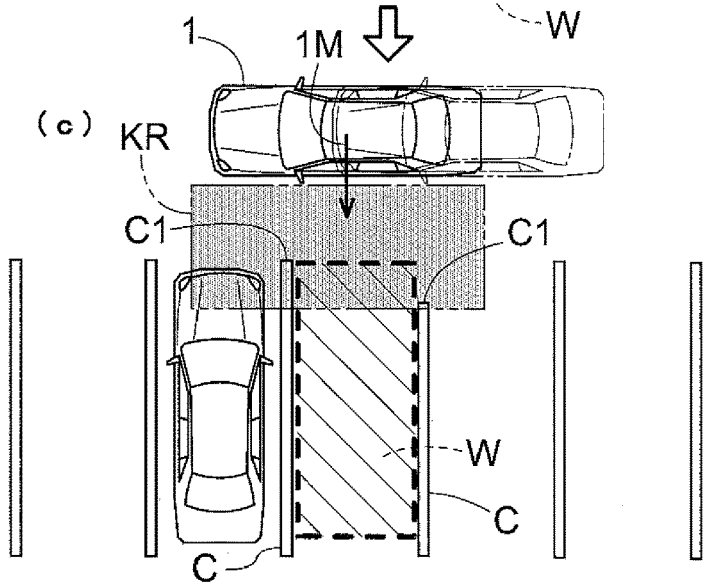

On the other hand, if the vehicle 1 is moved to a position shown in (b) of FIG. 5, the detection region KR also moves along with the vehicle 1. If, in the detection region KR, two ground objects C are detected which have end portions C1 whose distances from the vehicle 1 in the vehicle width direction 1M are different from each other, the target parking stall setting unit 14 sets the parking frame W with reference to the end portion C1 of, among the two ground objects C, the ground object C having an end portion C1 near the vehicle 1 in the vehicle width direction 1M (in the example shown in (b) of FIG. 5, it is set with reference to the end portion C1 of, among the two ground objects C having end portions C1 that exist in the detection region KR, the ground object C on the back side in the proceeding direction of the vehicle 1).

Furthermore, if the vehicle 1 moves to a position shown in (c) FIG. 5, the detection region KR also moves along with the vehicle 1. If, in the detection region KR, two ground objects C are detected which have end portions C1 whose distances from the vehicle 1 in the vehicle width direction 1M are different from each other, the target parking stall setting unit 14 sets the parking frame W with reference to the end portion C1 of, among the two ground objects C, the ground object C having an end portion C1 near the vehicle 1 in the vehicle width direction 1M (in the example shown in (c) FIG. 5, it is set with reference to the end portion C1 of, among the two ground objects C having end portions C1 that exist in the detection region KR, the ground object C on the front side in the proceeding direction of the vehicle 1). Accordingly, the parking assistance device 100 sets the parking frame W for the target parking stall PP.

Figure 6:
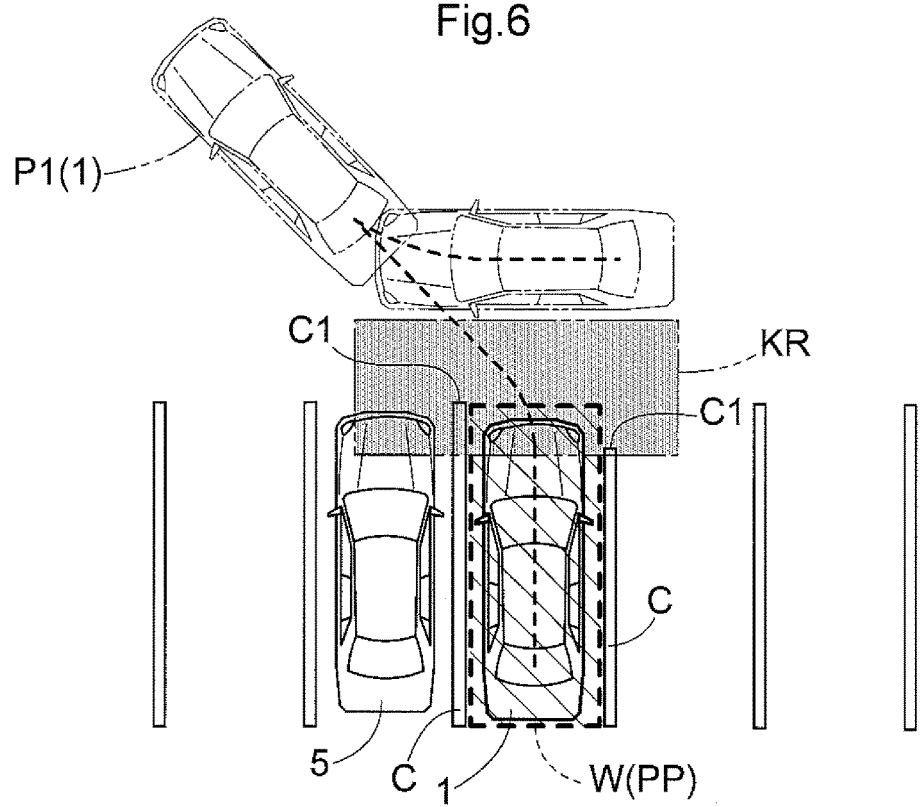
FIG. 6 is a diagram showing a state of traveling toward a target parking stall set by a parking assistance device.

Accordingly, in the case where the vehicle 1 is to be parked in a target parking stall PP in which a parking frame W has been set with reference to the end portion C1 of the ground object C that is closer to the vehicle 1 in the vehicle width direction 1M in the detection region KR as shown in FIG. 6 for example, even if another vehicle 5 is parked in the parking stall next to a reverse start position P1 adjacent to the target parking stall PP, it is possible to park the vehicle 1 in the target parking stall PP without the vehicle 1 coming into contact with the other vehicle 5.

Figure 7:
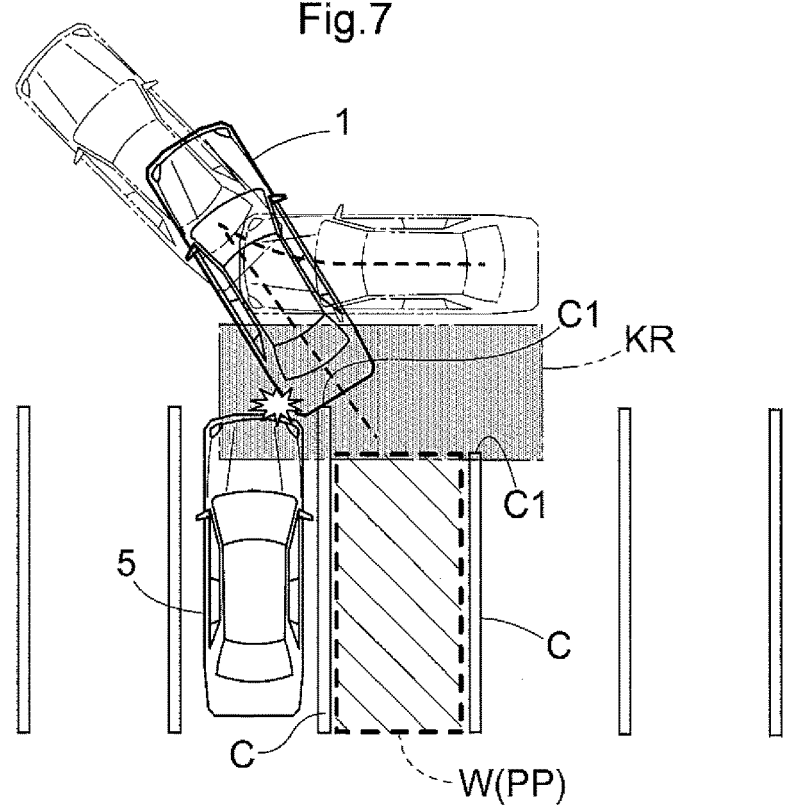
FIG. 7 is a contrasting example of a state of traveling toward a target parking stall set by a parking assistance device.

On the other hand, in the case where the vehicle 1 is to be parked in a target parking stall PP in which a parking frame W has been set with reference given to the end portion C1 of the ground object C that is farther from the vehicle 1 in the vehicle width direction 1M in the detection region KR as shown in FIG. 7 for example, if another vehicle 5 is parked in the parking stall next to the reverse start position P1 adjacent to the target parking stall PP, there is a possibility that the vehicle 1 will come into contact with the other vehicle 5. Thus, according to the parking assistance device 100, it is possible to prevent coming into contact with an object in the vicinity of the target parking stall PP and to park the vehicle 1 in the target parking stall PP, regardless of the state of the periphery of the target parking stall PP for the vehicle 1.

Figure 8:
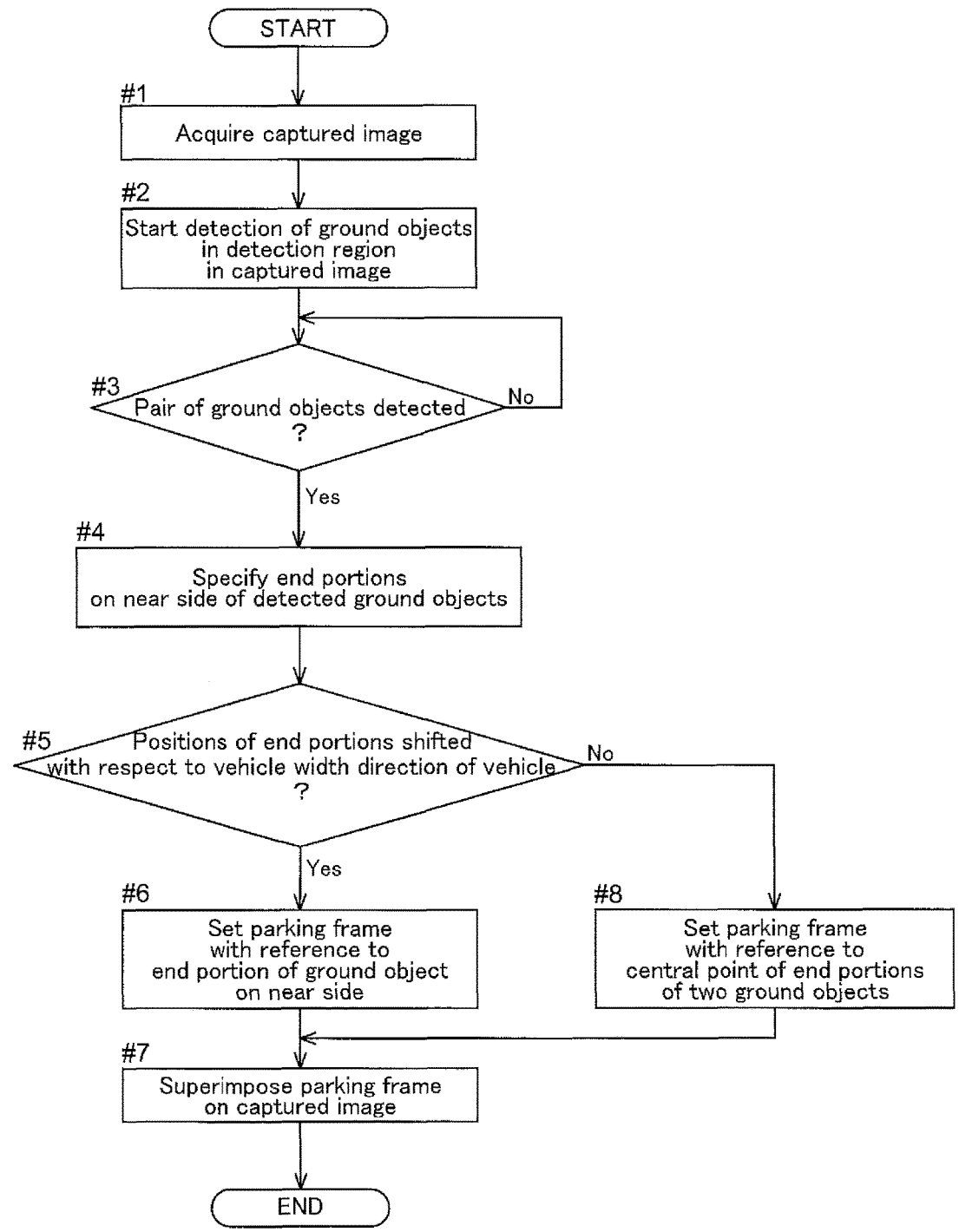
FIG. 8 is flowchart showing processing performed by a parking assistance device.

Next, processing performed by the parking assistance device 100 will be described with reference to the flowchart in FIG. 8. First, the captured image acquisition unit 11 acquires a captured image of a view of the periphery of the vehicle 1, captured by the camera 2 (step #1). Based on the captured image, the ground object detection unit 12 starts detection of a ground object C in the detection region KR in the captured image (step #2). If a pair of ground objects C that exist along the proceeding direction of the vehicle 1 are detected (step #3), the end portion specification unit 13 specifies the respective end portions C1 in the vehicle width direction 1M of the vehicle 1 of the detected pair of ground objects C (step #4).

If the positions of the respective detected end portions C1 are shifted with respect to the vehicle width direction 1M of the vehicle 1 (Yes in step #5), a parking frame W is set with reference to, among the respective end portions C1, the end portion C1 on the near side in the vehicle width direction 1M of the vehicle 1 (step #6). The thus-set parking frame W is superimposed on the captured image acquired by the captured image acquisition unit 11 and is displayed on the display unit 16 (step #7).

On the other hand, in step #5, if the positions of the respective detected end portions C1 are not shifted with respect to the vehicle width direction 1M of the vehicle 1 (No in step #5), the parking frame W is set with reference to the central points in the direction perpendicular to the vehicle width direction 1M of the two end portions C1 (step #8). The thus-set parking frame W is superimposed on the captured image acquired by the captured image acquisition unit 11 and is displayed on the display unit 16 (step #7). This processing is performed continuously accompanying the movement of the vehicle 1 until the vehicle 1 is parked in a target parking stall PP defined by a parking frame W.

Alternative Embodiments

In the above embodiment, a description was given using an example in which the predetermined detection region KR set in advance in at least a portion of the periphery of the vehicle 1 is set on only the left side of the vehicle 1. However, the range of application of the parking assistance device 100 of this disclosure is not limited to this. It is also possible to use a configuration in which the detection region KR is set on the right side of the vehicle 1, and it is natural that it is also possible to use a configuration in which the detection region KR is set on the left and right sides of the vehicle 1. Furthermore, setting in the front or back of the vehicle 1 is also possible. Thus, if the detection region KR is set in the front of the vehicle 1, it is possible to set a parking frame W for a parking stall R located in front of the vehicle 1, and if the detection region KR is set behind the vehicle 1, it is possible to set a parking frame W for a parking stall R located behind the vehicle 1.

In the above-described embodiment, a description was given in which the target parking stall setting unit 14 automatically re-sets the parking frame W according to movement of the detection region KR accompanying movement of the vehicle 1. However, the range of application of the parking assistance device 100 of this disclosure is not limited to this. It is also possible for the target parking stall setting unit 14 to be configured to not automatically re-set the parking frame W, even if the vehicle 1 moves. In such a case, it is preferable that the target parking stall setting unit 14 is configured to set the parking frame W according to an instruction from the driver, for example.

In the above-described embodiment, a description was given using an example in which a corner portion W1 of the parking frame W is set in the vicinity of an end portion C1 of a ground object C. However, the range of application of the parking assistance device 100 of this disclosure is not limited to this. For example, as shown in FIG. 9, if the gap between the pair of ground objects C that define the parking stall R is wide, it is also possible to set the corner portion W1 of the parking frame W at a position located away from the end portions C1 of the ground objects C. Even in such a case, it is sufficient that the end portion C1 located on the near side of the pair of ground objects C and the corner portion W1 match in the short side direction of the parking frame W, and it is preferable that the target parking stall setting unit 14 sets the corner portion W1 such that the central portion in the gap direction of the pair of ground objects C and the central portion in the short side direction of the parking frame W match.

This disclosure can be used for a parking assistance device configured to automatically set a parking frame that defines a target parking position in which a vehicle is to be parked.

What is claimed is:

1. A parking assistance device comprising:
a ground object detection unit configured to, in a predetermined detection region set in advance in at least a portion of a periphery of a vehicle, perform detection of a pair of ground objects, from an image taken by a camera mounted to the vehicle, defining a parking stall in which garage parking is to be performed;
an end portion specification unit configured to:
   determine whether or not the end portions of the respective pair of ground objects are shifted in the depth direction of the parking stall, and
   when it is determined that the end portions of the respective pair of ground objects are shifted in the depth direction of the parking stall, specify one end portion, from the end portions of the respective pair of ground objects, that is shifted further to the entrance side in the depth direction of the parking stall, as one of the end portions located on the entrance side of the parking stall;
a target parking stall setting unit configured to:
   when the end portion specification unit determines that the end portions of the respective pair of ground objects are not shifted in the depth direction of the parking stall, set the parking frame with reference to a central point between the two end portions in a direction perpendicular to the depth direction, and
   when the end portion specification unit determines that the end portions of the respective pair of ground objects are shifted in the depth direction of the parking stall, set, based on the one of the end portions located on the entrance side of the parking stall specified by the end portion specification unit, two of corner portions of a rectangular parking frame that define a target parking stall in which the vehicle is to be parked, and set the parking frame in reference to the two of the corner portions and an extending direction of the pair of ground objects such that the parking frame extends in the depth direction of the parking stall; and
a display unit configured to indicate a captured image on which the parking frame, set by the target stall setting unit, is superimposed.

2. A parking assistance device according to claim 1, wherein
the target parking stall setting unit re-sets the parking frame according to movement of the detection region accompanying movement of the vehicle.

3. A parking assistance device according to claim 1, wherein
the target parking stall setting unit sets the parking frame such that the one of the end portions located on the entrance side of the parking stall specified by the end portion specification unit and the two of the corner portions match in the short side direction of the parking frame.

4. A parking assistance device according to claim 2, wherein
the target parking stall setting unit sets the parking frame such that the one of the end portions located on the entrance side of the parking stall specified by the end portion specification unit and the two of the corner portions match in the short side direction of the parking frame.

5. A parking assistance device according to claim 1, wherein, when the end portion specification unit determines that the end portions of the respective pair of ground objects are shifted in the depth direction of the parking stall and a gap between the respective end portions is wider than a predetermined width, the target parking stall setting unit sets the corner portions so that a central portion in a gap direction of the respective end portions and a central portion in the short side direction of the parking frame match.

* * * * *